United States Patent [19]

Schwindeman et al.

[11] Patent Number: 5,821,307

[45] Date of Patent: *Oct. 13, 1998

[54] FUNCTIONALIZED CHAIN EXTENDED INITIATORS FOR ANIONIC POLYMERIZATION

[75] Inventors: James Anthony Schwindeman, Lincolnton; Conrad William Kamienski, Gastonia; Eric John Granger, Charlotte; Robert Charles Morrison, Gastonia, all of N.C.

[73] Assignee: FMC Corporation, Philadelphia, Pa.

[*] Notice: The term of this patent shall not extend beyond the expiration date of Pat. No. 5,708,092.

[21] Appl. No.: 652,215

[22] Filed: May 23, 1996

Related U.S. Application Data

[63] Continuation-in-part of Ser. No. 631,524, Apr. 12, 1996, Pat. No. 5,708,092, which is a continuation-in-part of Ser. No. 436,780, May 8, 1995, Pat. No. 5,565,526, which is a continuation-in-part of Ser. No. 242,518, May 13, 1994, abandoned.

[51] Int. Cl.⁶ .......................... C08F 297/04; C08F 4/46; C07C 43/115

[52] U.S. Cl. .......................... 525/272; 525/123; 525/126; 525/177; 525/184; 525/288; 525/292; 525/296; 525/298; 525/303; 525/308; 525/331.9; 525/332.2; 525/332.3; 525/332.9; 525/338; 525/342; 525/343; 525/366; 525/370; 525/374; 525/375; 525/383; 525/385; 525/388; 502/155; 502/156; 502/157; 556/470; 556/482; 564/305; 564/508; 568/626; 568/659; 568/671; 568/687; 260/665 R

[58] Field of Search .......................... 525/123, 126, 525/177, 184, 288, 292, 296, 298, 272, 388, 303, 308, 331.9, 332.2, 332.3, 332.9, 338, 342, 343, 366, 370, 374, 375, 383, 385; 260/655 R; 556/470, 482; 502/156, 157, 155; 568/626, 659, 687, 671; 564/305, 508

[56] References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,985,830 | 10/1976 | Fetters et al. . |
| 4,039,593 | 8/1977 | Kamienski et al. . |
| 4,994,526 | 2/1991 | Peters . |
| 5,310,490 | 5/1994 | Struglinski et al. . |
| 5,310,814 | 5/1994 | Struglinski et al. . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |

FOREIGN PATENT DOCUMENTS

| | | |
|---|---|---|
| 0 593 049 | 4/1994 | European Pat. Off. . |
| 0 632 075 | 1/1995 | European Pat. Off. . |
| 2 241 239 | 8/1991 | United Kingdom . |
| 2 270 317 | 3/1994 | United Kingdom . |
| WO 91/12277 | 8/1991 | WIPO . |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., Macromolecules 20, 2068–2076 (1987).

*Primary Examiner*—Fred M. Teskin
*Attorney, Agent, or Firm*—Bell Seltzer Intellectual Property Law Group of Alston & Bird LLP

[57] ABSTRACT

A process for the preparation of hydrocarbon solutions of monofunctional ether initiators of the following general structure:

$$M-Q_n-Z-OA(R^1R^2R^3)$$

wherein M is defined as an alkali metal, selected from the group consisting of lithium, sodium and potassium, Q is an aromatic substituted saturated hydrocarbyl group produced by the incorporation of one or more alkenyl substituted aromatic hydrocarbons containing 8–25 carbon atoms into the M—Z linkage; Z is a branched or straight chain hydrocarbon group which contains 3–25 carbon atoms, optionally containing aryl or substituted aryl groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5, monofunctional ethers produced by the process, use of the initiators in a polymerization process and polymers produced by the polymerization process.

47 Claims, No Drawings

FUNCTIONALIZED CHAIN EXTENDED INITIATORS FOR ANIONIC POLYMERIZATION

This application is a continuation-in-part of application Ser. No. 08/631,524, filed Apr. 12, 1996, now U.S. Pat. No. 5,708,092, which is a continuation-in-part of application Ser. No. 08/436,780, filed May 8, 1995, now U.S. Pat. No. 5,565,526, issued Oct. 15, 1996, which is a continuation-in-part of application Ser. No. 08/242,518 filed May 13, 1994, now abandoned.

This invention concerns a process for the polymerization of olefinic-containing monomers, polymers produced by this process, novel anionic initiators for use in the polymerization process and a process for making the anionic initiators.

Useful polymeric products are obtained by polymerizing olefinic containing monomers in the presence of an organoalkali metal initiator and subsequently reacting the resulting polymer, containing an active alkali metal end group or groups, with a reagent which will couple the polymer molecules or replace the alkali metal with more stable reactive end groups.

Monofunctional silyl ether initiators, containing alkali metal end groups useful in effecting such polymerization reactions are disclosed in Great Britain published patent application 2,241,239, published Aug. 28, 1991. These monofunctional silyl ether initiators were demonstrated to be useful in producing polybutadienes having desirable characteristics such as a molecular weight of typically 1,000 to 10,000, 1,4 content of typically 90%, etc.

A co-pending U.S. application Ser. No. 198,914, filed Feb. 18, 1994 discloses a process for the preparation of hydrocarbon solutions of monofunctional ether initiators of the following general structure:

$$M\text{---}Z\text{---}O\text{---}C(R^1R^2R^3) \qquad (I)$$

wherein M is defined as an alkali metal, preferably lithium; Z is a branched or straight chain hydrocarbon group which contains 3–25 carbon atoms, optionally containing aryl or substituted aryl groups; and $R_1$, $R_2$, and $R_3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and their employment as initiators in the anionic polymerization of olefin containing monomers in an inert, hydrocarbon solvent optionally containing a Lewis base. The process reacts selected omega-protected-1-haloalkyls whose alkyl groups contain 3 to 25 carbon atoms, with lithium metal at a temperature between about 35° C. and about 130° C., preferably at the reflux temperature of an alkane or cycloalkane reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation and is finally terminated with appropriate reagents so that the polymer is monofunctionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate was employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Monofunctional ether initiators prepared in accord with this earlier process can include, but are not limited to, 3-(1,1-dimethylethoxy)-1-propyllithium, 3-(1,1-dimethylpropoxy)-1-propyllithium, 5-(1,1-dimethylethoxy)-1-pentyllithium, 3-(1,1-dimethylethoxy)-2,2-dimethyl-1-propyllithium, 4-(1,1-dimethylethoxy)-1-butyllithium, 6-(1,1-dimethylethoxy)-1-hexyllithium, 8-(1,1-dimethylethoxy)-1-octyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino)-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy-]1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium. These monofunctional ether initiators have rather limited hydrocarbon solubility.

The present process provides monofunctional ether initiators with increased hydrocarbon solubility, a process for the production of these monofunctional ether initiators, an anionic polymerization process for polymerizing olefin containing monomers employing these new initiators and polymers produced by the new anionic polymerization process.

The monofunctional ether initiators, of this invention, having increased solubility in hydrocarbons are of the formula:

$$M-Q_n-Z-O(AR^1R^2R^3) \quad (II)$$

wherein M is defined as an alkali metal selected from the group consisting of lithium, sodium, and potassium; Q is an aromatic substituted hydrocarbyl group produced by the incorporation of one or more alkenyl substituted aromatic hydrocarbons containing 8–25 carbon atoms into the M—Z linkage; Z is a branched or straight chain hydrocarbon group which contains 3–25 carbon atoms, optionally containing aryl or substituted aryl groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and n is an integer from 1 to 5.

The process aspect of this invention for producing the initiators of formula (II) reacts selected omega-protected-1-haloalkanes wherein the connecting groups contain 3 to 25 carbon atoms, with an alkali metal, preferably lithium, at a temperature between about 35° C. and about 130° C., preferably at the solvent reflux temperature, to form a monofunctional lithium ether initiator (of formula I) which is then reacted with a conjugated diene hydrocarbon or a alkenylsubstituted aromatic hydrocarbon in an alkane or cycloalkane reaction solvent containing 5 to 10 carbon atoms and mixtures of such solvents to produce a monofunctional ether initiator with an extended chain or connecting between the metal atom (M) and oxygen (O) in formula (II) above. Q in formula (II) is preferably derived from conjugated 1,3-dienes.

Incorporation of Q groups into the M—Z linkage to form the compounds of formula (II) above involves addition of compounds of the formula $M-Z-O-(A-R^1R^2R^3)$, where the symbols have the meanings ascribed above, across the carbon to carbon double bonds in compounds selected from the group consisting of one or more alkenyl substituted aromatic compounds to produce new carbon-lithium bonds of a benzylic nature, much like those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—Z (M=Li) bonds, themselves.

The alkali metal, preferably lithium, used in preparing the monofunctional ethers is used as a dispersion whose particle size usually does not exceed about 300 microns. Preferably the particle size is between 10 and 300 microns although coarser particle size lithium can be used. The lithium metal can contain 0.2 to 0.8 and preferably 0.3 to 0.5 weight percent sodium. The lithium metal is used in amounts of 90% of theoretical to a 40% excess above the theoretical amount necessary to produce the monofunctional alkali metal ether initiators.

The olefinic monomers used in producing the initiators are chosen from the group, of unsaturated organic compounds that can be polymerized anionically in a reaction initiated by an alkali metal or its carbanionic derivative. These olefinic monomers include, but are limited to: 1,3-butadiene, isoprene, 2,3-dimethyl-1,3-butadiene, 1,3-pentadiene (piperylene), myrcene, 2-methyl-3-ethyl-1,3-butadiene, 3-methyl-1,3-pentadiene, 1,3hexadiene, 2,5-dimethyl-2,4-hexadiene and 1,3-octadiene. Among the dialkylbutadienes, it is preferred that the alkyl groups contain from 1 to 3 carbon atoms. Numerous other olefinic monomers are disclosed, for instance, in U. S. Pat. No. 3,377,404. Polymerizable alkenyl-substituted aromatic compounds which can be anionically polymerized include styrene; alpha-methylstyrene; vinyltoluene, 2-vinylpyridine, 4-vinylpyridine, 1-vinyinaphthalene, 2-vinyinaphthalene, 1-alpha-methylvinylnaphthalene, 2-alpha-methylvinyinaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3-methylstyrene, 3,5-diethylstyrene, 4-(tert-butyl)-styrene, 2-ethyl-4-benzylstyrene, 4-phenylstyrene, 4-p-tolylstyrene, 2,4-divinyltoluene and 4,5-dimethyl-1-vinyinaphthalene. Again, reference is made to U. S. Pat. No. 3,377,404 for disclosures of additional vinyl-substituted aromatic compounds. Non-polymerizable alkenyl substituted aromatic compounds such as 1,1-diphenylethylene may also be used.

The process of the current invention for producing the initiators uses omega-protected-1-haloalkyls which include but are not limited to, 3-(1,1-dimethylethoxy)-1-propylhalide, 3-(1,1-dimethylpropoxy)-1-propylhalide, 4-(methoxy)-1-butylhalide, 3-(triphenylmethoxy)-1-propylhalide, 5-(triphenylmethoxy)-1-pentylhalide, 6-(triphenylmethoxy)-1-hexylhalide, 8-(triphenylmethoxy)-1-octylhalide 3-(1,1-dimethylethoxy)-2-methyl-1-prophalide, 3-[3-(dimethylamino)-1-propyloxy]-1-propylhalide, 3-[2-(dimethylamino)-1-ethoxy]-1-propylhalide, 3-[2-(diethylamino)-1-ethoxy]-1-propylhalide, 3-[2-(diisopropyl)amino]-1-ethoxy]-1-propylhalide, 3-[2-(1-piperidino)-1-ethoxy]-1-propylhalide, 3-[2-(1-pyrrolidino)-1-ethoxy]-1-propylhalide, 4-[3-(dimethylamino)-1-propyloxy]-1-butylhalide, 6-[2-(1-piperidino)-1-ethoxy]-1-hexylhalide, 3-[2-(methoxy)-1-ethoxy]-1-propyihalide, 3-[2-(ethoxy)-1-ethoxy]-1-ethoxy]-1-propylhalide, 4-[2-(methoxy)-1-ethoxy]-1-butylhalide, 5-[2-(ethoxy)-1-ethoxy]-1-pentylhalide, 3-[3-(methylthio)-1-propyloxy]-1-propylhalide, 3-[4-(methylthio)-1-butyloxy]-1-propylhalide, 3-(methylthiomethoxy)-1-propylhalide, 6-[3-(methylthio)-1-propyloxy]-1-hexylhalide, 3-[4-(methoxy)-benzyloxy]-1-propylhalide, 3-[4-(1,1-dimethylethoxy)-benzyloxy]-1-propylhalide, 3-[2,4-(dimethoxy)-benzyloxy]-1-propylhalide, 8-[4-(methoxy)-benzyloxy]-1-octylhalide, 4-[4-(methylthio)-benzyloxy]-1-butylhalide, 3-[4-(dimethylamino)-benzyloxy]-1-propylhalide, 6-[4-(dimethylamino)-benzyloxy]-1-hexylhalide, 3-(1,1-dimethylethoxy)-2,2-dimethyl-1-propylhalide, 6-(t-butyldimethylsilyloxy)-1-hexylhalide, 3-(t-butyldimethylsilyloxy)-2,2-dimethyl-1-propylhalide; 3-(t-butyldimethylsilyloxy) -1-propylhalide; 4-(t-butyidimethylsilyloxy)-1-butylhalide and 3-(trimethylsilyloxy)-2,2-dimethyl-1-propylhalide. The halo- or halide group is selected from chlorine and bromine. The reaction temperature is above 50° C., the reaction medium is a hydrocarbon solvent and the reaction is conducted in an inert atmosphere.

Conjugated diene hydrocarbons useful in practicing this invention include but are not limited to: isoprene, 1,3-butadiene, piperylene (1,3-pentadiene), myrcene, 2,3-dimethyl-1,3-butadiene, 1,3-hexadiene, 2,4-hexadiene, 2,5-dimethyl-2,4-hexadine and the like as described above. Alkenylsubstituted aromatic hydrocarbons useful in practicing this invention include but are not limited to: styrene, alpha-methylstyrene, 2-vinylpyridine, 4-vinylpyridine, vinyltoluene, 4-(tert-butyl)-styrene, 1-vinylnapthalene, 3-methylstyrene, 4-methylstyrene, 1,1-diphenylethylene and the like as described above.

The present invention also provides a process for the anionic polymerization of olefinic-containing monomers comprising the steps of:

a) initiating polymerization of a conjugated diene monomer, a mixture of conjugated diene monomers and a mixture of one or more diene monomers together with one or more alkenylaromatic compounds in a hydrocarbon or mixed hydrocarbon-polar solvent medium at a temperature of 10° C. to 70° C. with an initiator having the formula:

$$M-Q_n-Z-O(AR^1R^2R^3) \qquad (II)$$

wherein M is defined as an alkali metal selected from the group consisting of lithium, sodium and potassium; Q is an aromatic substituted hydrocarbyl group produced by the incorporation of one or more alkenyl substituted aromatic hydrocarbons containing 8–25 carbon atoms into the M—Z linkage; Z is a branched or straight chain hydrocarbon group which contains 3–25 carbon atoms, optionally containing aryl or substituted aryl groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and n is an integer from 1 to 5; reacting the intermediate polymer with a reactive compound such as ethyene oxide, oxygen, sulfur, carbon dioxide, omega-alkenylarylhalosilanes such as styrenyidimethyl chlorosilane, chlorosilanes as exemplified by silicon tetrachloride and dimethyl dichlorosilane, and chlorostannanes as exemplified by tin tetrachloride and dibutyltin dichloride, oxetane, silicon acetals, 1,5-diazabicyclo[3.1.0]hexane, N-benzylidene trimethylsilylamide, 1,3-propanesultone, dimethylformamide, allyl bromide, allyl chloride, methacryloyl chloride and epichlorohydrin isomeric divinylbenzenes, diisopropenylbenzene and other materials known in the art to be useful for terminating, end capping or coupling of polymers; optionally hydrogenating the polymer; and b) recovering a linear or branched polymer having one or more terminal functional groups having the formula $FG-(Q)_x-Z-OA(R^1R^2R^3)$ wherein FG is a functional group derived from reaction of the intermediate polymer with one of the selected reactive compounds described above and x is the number of units of conjugated diene or alkenylsubstituted aromatic hydrocarbon (including that employed originally to solubilize the initiator) and may vary from 10 to 200 c) further reacting the functional polymer with other comonomers such as diesters, diisocyanates, di- or cyclic amides, and diols in the presence of a strong acid catalyst to simultaneously deprotect the functional polymer and polymerize both functional ends thereof to produce novel segmented block polymers, or d) further reacting the functional polymer with other comonomers in the absence of a strong acid catalyst to yield block copolymers, while maintaining the integrity of the protective group, or e) further removing the protective group and polymerizing the resultant functional block polymer from d) above with the same or other comonomers to produce novel segmented block polymers.

The inert solvent is preferably a non-polar solvent such as a hydrocarbon, since anionic polymerization in the presence of such non-polar solvents is known to produce polyenes with high 1,4-contents from 1,3-dienes. Solvents useful in practicing this invention include but are not limited to inert liquid alkanes, cycloalkanes and aryl solvents such as alkanes and cycloalkanes containing five to 10 carbon atoms such as pentane, hexane, cyclohexane,methylcyclohexane, heptane, methylcycloheptane, octane, decane and so forth and aryl solvents containing six to ten carbon atoms such as toluene, ethylbenzene, p-xylene, m-xylene, o-xylene, n-propylbenzene, isopropylbenzene, n-butylbenzene,and the like.

Polar modifiers can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran, 2-methyltetrahydrofuran, methyl tert-butyl ether, diazabicyclo[2.2.2]octane, triethylamine, tributylamine, tetramethylenthylene diamine (TMEDA), and 1,2-dimethoxyethane (glyme). The amount of the polar modifier added depends on the vinyl content desired, the nature of the monomer, the temperature of the polymerization, and the identity of the polar modifier.

The olefinic monomer to be anionically polymerized is preferably an alkenylaromatic or a 1,3-diene. The alkenylaromatic or 1,3-diene will be chosen from the group of unsaturated organic compounds that can be polymerized anionically (i.e. in a reaction initiated by an organo- alkali metal). Suitable alkenylaromatics include the optionally-substituted styrenes and vinyinaphthalenes. Suitable 1,3-dienes will preferably contain from 4 to 12, especially from 4 to 8, carbon atoms per molecule. Examples of these compounds include the following: 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Among the dialkylbutadienes, it is preferred that the alkyl groups contain from 1 to 3 carbon atoms. Of the above monomers 1,3-butadiene, isoprene, 2,3-dimethyl-1,3-butadiene and 1,3-pentadiene are preferred with 1,3-butadiene being particularly preferred. The dienes may be polymerised alone, or in admixture with each other or with alkenylaromatic compounds to form random copolymers, or by charging the dienes to the reaction mixture sequentially, either with each other or with alkenylaromatic compounds, to form block copolymers.

If desired, the protecting groups can be removed from the polymer. This deprotection can be performed either prior to or after the optional hydrogenation of the residual aliphatic unsaturation. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the star polymer with trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41. The tert-butyldimethylsilyl protecting groups can be removed by treatment of the star polymer cement with acid, such as hydrochloric acid, acetic acid, paratoluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83.

Examples of methods to hydrogenate the polymers of this invention are described in U. S. Pat. Nos. 4,970,254, 5,166,277, 5,393,843 and 5,496,898. The hydrogenation of the functionalized star polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nucluer Magnetic Resonance (NMR) spectroscopy. The hydrogenation reaction is conducted until at least 90% of the aliphatic unsaturation has been saturated. The hydrogenated star polymer is then recovered by conventional procedures, such as removal of the catalyst with aqueous acid wash, followed by solvent removal or precipitation of the polymer.

For example, a protected functional living polymer of this invention can be generated by polymerizing 1,3-butadiene with an initiator of formula II above, wherein M is lithium, Z is a trimethylene connecting group, Q is styrene, n is 3, and $R^1$, $R^2$, and $R^3$ are methyl groups. A living polymer is produced having the formula $$\text{Li}-(B)_m-(St)_3(CH_2)_3-O-C(CH_3)_3 \quad (III)$$

where B is a unit derived by polymerizing butadiene, m is an integer from about 10 to 200, and St is a unit derived by polymerization of styrene. The living polymer III, may be reacted, for example, with ethylene oxide to yield, after hydrolysis, the compound of formula $$\text{HOCH}_2\text{CH}_2-(B)_m(St)_3-(CH_2)_3-O-C(CH_3)_3 \quad (IV)$$

which may optionally be hydrogenated to the corresponding asymmetric polymer.

Additionally, other asymmetrically monofunctional polymers may be produced by reacting the living polymer (III) above with, for example, carbon dioxide to produce, a polymer with one protected hydroxyl and one carboxyl group, or the living polymer III may be reacted with 1,5 diazabicyclo-(3.1.0) hexane as described in U. S. Pat. No. 4,753,991 to produce a polymer with one protected hydroxyl and one amino group.

Other asymmetrically substituted monofunctional polymers may be produced having epoxy or isocyanate groups at one end for example by reacting the lithium salt of IV above (before hydrolysis), with epichlorohydrin or, by reacting IV itself with an equivalent of a diisocyanate, such as methylene 4,4-diphenyl diisocyante (2/1 NCO/OH). These unsymmetrically substituted monofunctional polymers could then be further reacted with other comonomers either with or without simultaneous deprotection as described below.

The protected monohydroxy polymers (IV) alone and in their hydrogenated forms, could be used as base materials to lend flexibility and higher impact strength in a number of formulas to produce coatings, sealants, binders and block copolymers with polyesters, polyamides and polycarbonates as described in UK Patent Application GB2270317A and in "Polytail" data sheets and brochures (Mitsubishi Kasei America).

Thus, in the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

Thus, for example, hydrogenated IV polymers may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated IV block copolymer is also useful as a molding composition to prepare exterior automotive components that can be prepared by reacting hydrogenated IV polymer with caprolactam and adipic acid in the presence of a suitable catalyst.

A segmented polyester-hydrogenated IV block copolymer is produced by reaction of hydrogenated IV polymer with dimethyl terephthalate and a suitable acidic catalyst. Again, the products are useful as molding compounds for exterior automotive components.

Isocyanate-terminated prepolymers can be produced from hydrogenated IV polymers by reaction with suitable diisocyanates (2/1 NCO/OH) as above and which can be further reacted with diols and additional diisocyanates to form segmented polyurethanes useful for water based, low VOC coatings. Or segmented polyurethane prepolymers may be mixed with tackifying resins and used as a moisture-curable sealant, caulk or coating.

An acrylate-terminated prepolymer curable by free-radical processes can be prepared from the hydrogenated IV polymer by reaction with a diisocyanate (2NCO/OH) followed by further reaction with hydroxyethyl acrylate in the presence of a basic reagent.

Alternatively, the protected monohydroxy terminated polymer (IV) may be reacted with functional comonomers, without simultaneously removing the protective group, to produce novel copolymers. These copolymers then may be deprotected and then further reacted with the same or different comonomers to form yet other novel copolymers. Thus, for example, the hydroxyterminated polymer of formula (IV) may be hydrogenated, and then reacted with ethylene oxide in the presence of potassium tert-butoxide to produce a poly(ethleneoxide)-hydrogenated polybutadiene copolymer with one protected hydroxyl group on the polybutadiene segment. This hydroxyl can then be deprotected and a poly(ethyleneoxide) polymer having different chain lengths grown onto both ends of the polybutadiene segment.

These processes can be applied to the deprotected and optionally hydrogenated polymers of formula IV, as well. Thus, alternatively, the protective group could be removed first from the hydrogenated polymer, and then the block copolymers formed by addition of the appropriate comonomers.

In another possible application, the living polymer III may be reacted with an alkenylarylhalosilane such as styrenyldimethylchlorosilane to yield the corresponding omega-styrenylterminated macromonomer according to directions in U.S. Pat. No. 5,278,244, which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another example, a living polymer analogous to III having the formula

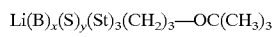

$$Li(B)_x(S)_y(St)_3(CH_2)_3-OC(CH_3)_3$$

where B is polymerized butadiene, S is polymerized styrene and x and y can vary from 10 to 1000 or more is reacted with divinylbenzene (DVB) to produce a multi-armed star polymer, according to U. S. Pat. No. 4,409,357 which on hydrogenation and deprotection would yield a star polymer with hydroxy-terminated branches. These hydroxy groups may also be further reacted with ethylene oxide and potassium alkoxide as described above to produce hydrogels.

In still another possible application, the hydrogenated hydroxyterminated branches of the star polymer may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels.

Star polymers are useful as viscosity index improver for motor oils.

Other monomers may be reacted directly with formula III type monofunctional compounds to yield block or star copolymers.

The following examples further illustrate the invention.

EXAMPLE 1

Preparation of 3-(1,1-Dimethylethoxy)-1-propyllithium Chain Extended with Styrene Lot 18976 HYPOTHETICAL A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.00 grams (0.720 mole, 2.80 equivalents) is transferred to the flask with 250 ml cyclohexane. This suspension is stirred at 450 RPMs, and heated to 63° C. with a heating mantle. The heat source is removed. 3-Chloro-1-(1,1-dimethylethoxy)propane, 38.73 grams (0.257 mole, 1.00 equivalent) is added dropwise. An exotherm is detected after 16% of the feed has been added. A dry ice/hexane cooling bath is applied to maintain the reaction temperature at 60°–65° C. The total feed time is sixty five minutes. An exotherm is noted until the last drop of feed is added, then the temperature falls off rapidly to room temperature. The reaction mixture is stirred at room temperature for forty minutes, then is heated to 55° C. with a heating mantle. The heat source is removed. Styrene, 26.77 grams (0.257 mole, 1.00 equivalent) is then added dropwise. An exotherm is noted after 30% of the feed has been added. Hexane cooling is applied to maintain the reaction temperature at 50°–55° C. The total styrene feed time is forty two minutes. The reaction mixture is allowed to stir at room temperature for one hour, then is transferred to a small pressure filter with argon pressure. Very rapid filtration is observed with 2 psi argon. The muds are reslurried with cyclohexane (2×50 ml). This affords a pale yellow, clear solution, yield=480 ml, 381.50 grams.

Total base=14.4 wt. %.

Active C—Li=13.8 wt %.

Yield (based on active C—Li)=90.6%.

Comparative Example

Preparation of 3-(1,1-Dimethylethoxy)-1-propyllithium Lot 8888 (461-27)

A 500 ml, three-necked Morton flask was equipped with a mechanical stirrer, a 125 ml, pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 4.07 grams (0.586 mole, 2.80 equivalents) was transferred to the flask with 150 ml cyclohexane. This suspension was stirred at 450 RPMs, and heated to 70° C. with a heating mantle. The heat source was removed. 3-Chloro-1-(1,1-dimethylethoxy)propane, 31.52 grams (0.209 mole, 1.00 equivalent) was added dropwise. An exotherm was detected after 5.5% of the feed had been added. A dry ice/hexane cooling bath was applied to maintain the reaction temperature at 60°–650° C. The total feed time was fifty-two minutes. An exotherm was noted until the last drop of feed was added, then the temperature fell off rapidly to room temperature. The reaction mixture was allowed to stir at room temperature for three and a half hours, then transferred to a small pressure filter with argon pressure. Very rapid filtration was observed with 2 psi argon. The muds were reslurried with cyclohexane (2×50 ml). This afforded a pale yellow, hazy solution, yield=230 ml, 185.03 grams.

Total base=3.85 wt. %

Active C—Li=3.78 wt %

Yield (based on active C—Li)=27.4%

A one milliliter aliquot of this solution was withdrawn, cooled to 0° C., and carefully quenched with water. The organic layer was then analyzed by gas chromatography. A Perkin Elmer Autosystem CC, equipped with a 30 meter, 0.53 mm AT-1 column, was employed for this analysis. All the 3-chloro-1-(1,1-dimethylethoxy)propane had been consumed, with the formation of a single, lower boiling compound, identified as 1-(1,1-dimethylethoxy)propane.

This comparison example is a repeat of Example 1 except that no styrene was added to the reaction. The product of Example 1 was more soluble in cyclohexane then was the product of the Comparitive Example to which no styrene was added. It is surprising that the active carbon-lithium of Example 1 was 13.8 weight percent while the comparison was only 3.78 weight percent, even though the molecular weight of the compound in Example 1 is almost twice that of the compound of the Comparative Example.

EXAMPLE 2

Preparation of 3-(1,1-Dimethylpropoxy)-2,2-dimethyl-1-propyllithium Chain Extended with Styrene Lot 18977 HYPOTHETICAL A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.10 grams (0.735 mole, 2.80 equivalents) is transferred to the flask with 250 ml cyclohexane. This suspension is stirred at 450 RPMs, and heated to 65° C. with a heating mantle. The heat source is removed. 3-Chloro-2,2-dimethyl-1-(1,1-dimethylpropoxy)propane, 48.91 grams (0.254 mole, 1.00 equivalent) is added dropwise. An exotherm is detected after 10.7% of the feed has been added. A dry ice/hexane cooling bath is applied to maintain the reaction temperature at 60°–65° C. The total feed time is sixty minutes. An exotherm is noted until the last drop of feed is added, then the temperature falls off rapidly to room temperature. The reaction mixture is stirred at room temperature for forty minutes, then heated to 65° C. with a heating mantle. The heat source is removed. Styrene, 26.45 grams (0.254 mole, 1.00 equivalents) is then added dropwise. An exotherm is noted after 5.6% of the feed has been added. Hexane cooling is applied to maintain the reaction temperature at 60°–65° C. The total styrene feed time is thirty minutes. The reaction mixture is allowed to stir at room temperature for one hour, then transferred to a small pressure filter with argon pressure. Very rapid filtration is observed with 2 psi argon. The muds are reslurried with cyclohexane (2×75 ml). This affords a yellow, clear solution, yield=480 ml, 380.84 grams.

Total base=15.8 wt. %.
Active C—Li=15.4 wt %.
Yield (based on active C—Li)=86.1%.

EXAMPLE 3

Preparation of 3-(t-Butyldimethylsilyloxy)-1-propyllithium Chain Extended with Alpha-Methylstyrene Lot 18983 HYPOTHETICAL A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 650° C. with a heating mantle. The heat source is removed. 1-(t-Butyidimethylsilyloxy)-3-chloro-propane, 55.82 grams (0.268 mole, 1.00 equivalent) is added dropwise. An exotherm is detected after 31.8% of the feed has been added. A dry ice/hexane cooling bath is applied to maintain the reaction temperature at 60°–65° C. The total feed time is one hundred five minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Alpha-methylstyrene, 31.67 grams (0.268 mole, 1.00 equivalents) is then added dropwise. An exotherm is noted after 24.6% of the feed has been added. Hexane cooling is applied to maintain the reaction temperature at 60°–65° C. The total alpha-methylstyrene feed time is thirty eight minutes. The reaction mixture is allowed to stir at room temperature for one hour, then transferred to a small pressure filter with argon pressure. Very rapid filtration is observed with 2 psi argon. The muds are reslurried with cyclohexane (2×50 ml). This affords an orange solution, yield=530 ml, 425.34 grams.

Total base=16.1 wt. %.
Active C—Li=15.5 wt %.
Yield (based on active C—Li)=82.5%.

EXAMPLE 4

Polymerization of Isoprene using an Initiator Prepared by Chain Extension of 3-(1,1-Dimethylethoxy)-1-propyllithium with Styrene Lot 18985 HYPOTHETICAL To a solution of 40.31 grams of isoprene dissolved in 400 ml of dry cyclohexane at 14.7° C. is added 36.70 g of a 13.8 weight per cent solution in cyclohexane of 3-(1,1-dimethylethoxy)-1-propyllithium, chain-extented with one mole of styrene per mole of organolithium. The solution temperature rises to 15.9° C. during addition of the initiator. The solution is then heated to 51.2° C., and then the heat source is withdrawn. An exotherm is observed to 63.4° C., at which point a cooling bath is briefly applied to moderate the reaction temperature. After about one hour the temperature has dropped to 28.5° C. The reaction mixture is allowed to stand an additional 21 hours, after which it is quenched with 40 ml of anhydrous methanol. Hexane (100 ml) is added and the layers are separated. The hydrocarbon layer is washed once again with 40 ml of methanol and then the solvent is stripped under vacuum at 35° C. in a RotoVap unit to constant weight. A weight of 45.2 grams of a clear somewhat viscous, easily pourable oil is obtained (Theory= 46.1 g)

EXAMPLE 5

Polymerization of Isoprene using an Initiator Prepared by Chain Extension of 2,2-Dimethyl-3-(1, 1-dimethylpropoxy)-1-propyllithium with Styrene Lot 18986 HYPOTHETICAL To a solution of 40.44 grams of isoprene dissolved in 400 ml (307.5 g) of cyclohexane at 19.6° C. is added 37.09 grams of a 15.4 weight percent solution in cyclohexane of 2,2-dimethyl-3-(1,1-dimethylpropoxy)-1-propyllithium, chain-extended with one mole of styrene per mole of organolithium. The reactants are heated to 50° C. and reaction is allowed to proceed on its own. When the temperature reaches 64.1° C., the reaction mixture is cooled briefly. The reaction temperature gradually drops to 43.1° C. after 24 minutes, and to 23.2° C. after a further 2 hours. The mixture is quenched with 40 ml of methanol after standing for 14 hours. Hexane (100 ml) is added, the layers are separated and the hydrocarbon layer is washed once again with 40 ml of methanol, and then the solvent is stripped under vacuum at 35° C. to constant weight. A weight of 46.4 grams of a clear, somewhat viscous oily polymer is obtained (Theory= 46.44 g)

EXAMPLE 6

Polymerization of Isoprene using an Initiator Prepared by Chain Extension of 3-(t-Butyidimethylsilyloxy)-1-propyllithium with Alpha-Methylstyrene Lot 19006 HYPOTHETICAL To a solution of 40.09 grams of isoprene dissolved in 400 ml of dry cyclohexane is added 39.25 grams of a 15.5 weight percent solution of 3-(t-butyldimethylsilyloxy)-1-propyllithium chain-extended with one mole of styrene per mole of organollithium in cyclohexane. The solution is stirred and heated to 51.3° C., at which point the temperature continued to rise on its own, reaching 68.1° C. before a cooling bath is applied. After about 2 hours, the reaction has cooled to 22.4° C. and the reaction mixture is allowed to stand overnight. Hexane (100 ml) and 40 ml of methanol are added and the mixture is stirred for one hour. The hydrocarbon layer is separated, washed again with 40 ml of methanol, and the solvent is stripped of solvent under vacuum. A weight of 48.2 grams of liquid polymer is recovered.

EXAMPLE 7

Polymerization of Butadiene Using an Initiator Prepared by Chain Extension of 3-(1,1-Dimethylethoxy)-1-Propyllithium with Styrene Lot 9036 HYPOTHETICAL To a solution of 42.0 grams of butadiene dissolved in 312 grams of cyclohexane at 3.3° C. is added 4.19 grams of a 13.8 weight percent solution in cyclohexane of 3-(dimethylethoxy)-1-propyllithium chain-extended with one mole of styrene per mole of organolithium. The mixture is heated to 35.4° C. at which point refluxing of the butadiene is noted. The reaction proceeded slowly, the temperature gradually rising to 40° C., at which point the heat is cut off. The temperature gradually rises on its own to 43° C., then is heated still further to 52.3° C. (total heating time is about 1.5 hours). After standing for 16 hours at room temperature, the mixture is treated with 100 ml of hexane and 40 ml of methanol for one hour. The layers are separated and the upper hydrocarbon layer is washed again with 40 ml of methanol. The hydrocarbon layer is stripped of solvent under vacuum at 35° C. to yield 43.0 grams of a light yellow, clear, slightly viscous fluid.

What is claimed is:

1. A process for the preparation of hydrocarbon solutions of monofunctional ether initiators comprising:

reacting an omega-protected-1-haloalkane with an alkali metal to form a monofunctional ether of the following structure:

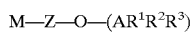

wherein:

M is defined as an alkali metal selected from the group consisting of lithium, sodium and potassium; Z is a branched or straight chain hydrocarbon group which contains 3–25 carbon atoms, optionally containing aryl or substituted aryl groups containing lower alkyl, lower alkylthio, and lower dialkyl amino groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl; and reacting said monofunctional ether with one or more alkenyl substituted aromatic compounds in a hydrocarbon solvent to produce a compound having the following structure:

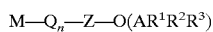

wherein:

M, Z, A, $R^1$, $R^2$, and $R^3$ are the same as defined above; Q is an aromatic substituted hydrocarbyl group produced by the incorporation of one or more alkenyl substituted aromatic compounds containing 8–25 carbon atoms into the M—Z linkage and n is an integer from 1 to 5.

2. The process of claim 1 wherein the reaction temperature is the reflux temperature of the solvent.

3. The process of claim 1 wherein the omega-protected-1-haloalkane is selected from 3-(1,1-dimethylethoxy)-1-propylhalide, 3-(1,1-dimethylethoxy)-2-methyl-1-propylhalide, 3-(1,1-dimethylethoxy)-2,2-dimethyl-1-propylhalide, 4-(1,1-dimethylethoxy)-1-butylhalide, 5-(1,1-dimethylethoxy)-1-pentylhalide, 6-(1,1-dimethylethoxy)-1-hexylhalide, 8-(1,1-dimethylethoxy)-1-octylhalide, 3-(1,1-dimethylpropoxy)-1-propylhalide, 3-(1,1-dimethylpropoxy)-2-methyl-1-propylhalide, 3-(1,1-dimethylpropoxy)-2,2-dimethyl-1-propylhalide, 4-(1,1-dimethylpropoxy)-1-butylylhalide, 5-(1,1-dimethylpropoxy)-1-pentylhalide, 6-(1,1-dimethylpropoxy)-1-hexylhalide, 4-(methoxy)-1-butylhalide, 4-(ethoxy)-1-butylhalide, 4-(1-methylethoxy)-1-butylhalide, 3-(triphenylmethoxy)-1-propylhalide, 3-(triphenylmethoxy)-2-methyl-1-propylhalide, 3-(triphenylmethoxy)-2,2-dimethyl-1-propylhalide, 4-(triphenylmethoxy)-1-butylhalide, 5-(triphenylmethoxy)-1-pentylhalide, 6-(triphenylmethoxy)-1-hexylhalide, 8-(triphenylmethoxy)-1-octylhalide, 3-[3-(dimethylamino)-1-propyloxy]-1-propylhalide, 3-[2-(dimethylamino)-1-ethoxy]-1-propylhalide, 3-[2-(diethylamino)-1-ethoxy]-1-propylhalide, 3-[2-(diisopropyl)amino]-1-ethoxy]-1-propylhalide, 3-[2-(1-piperidino)-1-ethoxy]-1-propylhalide, 3-[2-(1-pyrrolidino)-1-ethoxy]-1-propylhalide, 4-[3-(dimethylamino)-1-propyloxy]-1-butylhalide, 6-[2-(1-piperidino)-1-ethoxy]-1-hexylhalide, 3-[2-(methoxy)-1-ethoxy]-1-propylhalide, 3-[2-(ethoxy)-1-ethoxy]-1-propylhalide, 4-[2-(methoxy)-1-ethoxy]-1-butylhalide, 5-[2-(ethoxy)-1-ethoxy]-1-pentylhalide, 3-[3-(methylthio)-1-propyloxy]-1-propylhalide, 3-[4-(methylthio)-1-butyloxy]-1-propylhalide, 3-(methylthiomethoxy)-1-propylhalide, 6-[3-(methylthio)-1-propyloxy]-1-hexylhalide, 3-[4-(methoxy)-benzyoxy]-1-propylhalide, 3-[4-(1,1-dimethylethoxy)-benzyloxy]-1-propylhalide, 3-[2,4-(dimethoxy)-benzyloxy]-1-propylhalide, 8-[4-(methoxy)-benzyoxy]-1-octylhalide, 4-[4-(methylthio)-benzyoxy]-1-butylhalide, 3-[4-(dimethylamino)-benzyloxy]-1-propylhalide, 6-[4-(dimethylamino)-benzyloxy]-1-hexylhalide, 3-(t-butyldimethylsilyloxy)-1-propylhalide, 3-(t-butyldimethylsilyloxy)-2-methyl-1-propylhalide, 3-(t-butyldimethylsilyloxy)-2,2-dimethyl-1-propylhalide, 4-(t-butyldimethylsilyloxy)-1-butylhalide, 5-(t-butyldimethylsilyloxy)-1-pentylhalide, 6-(t-butyldimethylsilyloxy)-1-hexylhalide, 8-(t-butyldimethylsilyloxy)-1-octylhalide, and 3-(trimethylsilyloxy)-2,2-dimethyl-1-propylhalide.

4. The process of claim 3 characterized in that the halide is selected from the group consisting of bromine and chlorine.

5. The process of claim 1 wherein the alkali metal is lithium.

6. The process of claim 5 wherein the lithium metal contains 0.2 to 0.8 weight percent sodium.

7. The process of claim 5 wherein the lithium metal contains 0.3 to 0.5 weight percent sodium.

8. The process of claim 1 wherein the alkenylsubstituted aromatic compound is selected from alpha-methylstyrene, styrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene, 1,2-diphenyl-4-methylhexene-1 and 1,1-diphenylethylene.

9. A monofunctional ether anionic polymerization initiator comprising a compound of the formula:

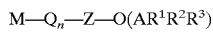

wherein M is defined as an alkali metal selected from the group consisting of lithium, sodium, and potassium; Q is an aromatic substituted hydrocarbyl group produced by the incorporation of one or more alkenyl substituted aromatic compounds containing 8–25 carbon atoms into the M—Z linkage; Z is a branched or straight chain hydrocarbon group which contains 3–25 carbon atoms, optionally containing aryl or substituted aryl groups containing lower alkyl, lower alkylthio, and lower dialkylamino groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl groups containing 5 to 12 carbon atoms, and n is an integer from 1 to 5.

10. The compound of claim 9 where in the alkali metal is selected from the group consisting of lithium, sodium and potassium.

11. The compound of claim 9 where in the alkali metal is selected from the group consisting of lithium and sodium.

12. The compound of claim 9 where in the branched or straight chain hydrocarbon connecting group contains 3 to 8 carbon atoms.

13. The compound of claim 9 wherein the alkali metal is lithium.

14. The compound of claim 13 wherein the lithium metal contains 0.2 to 0.8 weight percent sodium.

15. The compound of claim 13 wherein the lithium metal contains 0.3 to 0.5 weight percent sodium.

16. A process for the anionic polymerization of olefinic-containing monomer comprising the steps of:

a) initiating polymerization of a monomer selected from the group consisting of a conjugated diene monomer, a mixture of conjugated diene monomers and a mixture of one or more conjugated diene monomers together with one or more alkenyl substituted aromatic compounds, in a liquid reaction medium, at a temperature of −30° C. to 150° C., with an initiator having the formula:

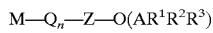

wherein M is defined as an alkali metal selected from the group consisting of lithium, sodium, and potassium; Q is an aromatic substituted hydrocarbyl group produced by the incorporation of one or more alkenyl substituted aromatic hydrocarbons containing 8–25 carbon atoms into the M—Z linkage; Z is a branched or straight chain hydrocarbon group which contains 3–25 carbon atoms, optionally containing aryl or substituted aryl groups containing lower alkyl, lower alkylthio, and lower dialkylamino groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl groups containing 5 to 12 carbon atoms, and n is an integer from 1 to 5, to produce an intermediate polymer; and b) reacting the intermediate polymer with a functionalizing compound to produce a functionalized polymer c) optionally hydrogenating the functionalized polymer d) further reacting the functionalized polymer with other comonomers in the presence of a strong acid catalyst to simultaneously deprotect the polymer and polymerize the comonomers at both functional sites or e) further reacting the functionalized polymer with comonomers in the absence of strong acid catalysts, then deprotecting the resultant copolymer, and f) further reacting the resultant copolymer with the same or other comonomers.

17. The process of claim 16 wherein the functionalizing compound is selected from the group consisting of oxygen, sulfur, ethylene oxide, carbon dioxide, omega-alkenylarylhalosilanes, chlorosilanes, chlorostannanes, oxetane, silicon acetals, 1,5-diazabicyclo[3.1.0]hexane, N-benzylidene trimethylsilylamide, 1,3-propanesultone, dimethylformamide, allyl bromide, allyl chloride, methacryloyl chloride and epichlorohydrin prior to recovering the polymer.

18. The process of claim 16 wherein the conjugated diene monomer is selected from the group consisting of 1,3-butadiene, isoprene, myrcene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 2,5-dimethyl-2,4-hexadiene and 1,3-octadiene.

19. The process of claim 16 wherein the alkenylsubstituted aromatic compound is selected from alpha-methylstyrene, styrene, vinyltoluene, 2-vinylpyridine, 4-vinylpyridine, 4-(tert-butyl)-styrene, 1-vinylnaphthalene, 2-vinyinaphthalene, 1-alpha-methylvinylnaphthalene, 2-alpha-methylvinylnaphathalene, and 1,2-diphenyl-4-methylhexene-1.

20. The process of claim 16 further comprising the step of hydrogenating the polymerized conjugated diene.

21. The process of claim 16 wherein the intermediate polymer is reacted with isomeric divinylbenzenes or diisopropenylbenzenes and deprotected to yield star-branched polymers with hydroxy-terminated branches.

22. The process of claim 21 wherein the star-branched polymers are hydrogenated.

23. The process of claim 22 wherein the polymers are further reacted with ethylene oxide and potassium t-butoxide to produce hydrogels.

24. The process of claim 22 wherein the polymers are reacted with acryloyl chloride and methacryloyl chloride.

25. The process of claim 24 wherein the products of the reaction are further reacted with alkyl acrylates, alkyl methacrylates, and dialkyl acrylamides to produce hydrogels.

26. The process of claim 16 wherein the functionalizing compound is ethylene oxide, the functionalized polymer is hydrogenated, and the comonomers are selected from the group consisting of epichlorohydrin and diisocyanates to produce epoxide and isocyanate-terminated polymers.

27. The process of claim 26 further characterized by simultaneous deprotection and polymerization of the isocyanate and epoxy-terminated polymers.

28. The process of claim 16 wherein the functionalizing compound is ethylene oxide and the comonomers are selected from the group of dialkylterephthalates, alpha, omega-alkane diols, caprolactam and adipic acid, and the deprotection is carried out simultaneously with polymerization.

29. The process of claim 18 wherein the functionalizing compound is ethylene oxide, the comonomer is ethylene oxide, the polymerization is carried out in the presence of potassium tert-butoxide, the resulting copolymer is deprotected and reaction with the comonomer continued.

30. The process of claim 18 wherein the functionalizing compound is ethylene oxide, the functional polymer is hydrogenated and reacted with a diisocyanate in a 2:1 ratio, further reacted with hydroxyethylacrylate in the presence of a basic catalyst, and deprotected to yield a macromonomer.

31. The process of claim 18 wherein the functionalizing compound is to styrenyldimethylchlorosilane.

32. A functionalized polymer produced by a process comprising the steps of:
  a) initiating polymerization of a monomer selected from the group consisting of a conjugated diene monomer, a mixture of conjugated diene monomers and a mixture of one or more conjugated diene monomers together with one or more alkenyl substituted aromatic compounds, in a liquid reaction medium, at a temperature of $-30°$ C. to $150°$ C., with an initiator having the formula $$M—Q_n—Z—OA(R^1R^2R^3)$$

wherein M is defined as an alkali metal selected from the group consisting of lithium, sodium, and potassium; Q is an aromatic substituted hydrocarbyl group produced by the incorporation of one or more alkenyl substituted aromatic hydrocarbons containing 8–25 carbon atoms into the M—Z linkage; Z is a branched or straight chain hydrocarbon group which contains 3–25 carbon atoms, optionally containing aryl or substituted aryl groups containing lower alkyl, lower alkylthio, and lower dialkylamino groups; $(AR^1R^2R^3)$ is a protecting group in which A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl groups containing 5 to 12 carbon atoms, and n is an integer from 1 to 5; b) reacting the intermediate polymer with a functionalizing compound, c) optionally hydrogenating the polymer, d) further reacting the functionalized polymer with other comonomers in the presence of a strong acid to simultaneously deprotect the polymer and polymerize the comonomers at both functional sites or e) further reacting the functionalized polymer with comonomers in the absence of a strong acid catalyst, followed by deprotection and further reaction with the same or other comonomers.

33. The polymer of claim 32 wherein the functionalizing compound is selected from the group of ethylene oxide, oxygen, sulfur, carbon dioxide, omega-alkenylarylhalosilanes, chlorosilanes, chlorostannanes, oxetane, silicon acetals, 1,5-diazabicyclo[3.1.0]hexane, N-benzylidene trimethylsilylamide, 1,3-propanesultone, dimethylformamide, allyl bromide, allyl chloride, methacryloyl chloride and epichlorohydrin.

34. The polymer of claim 32 wherein the conjugated diene monomer is selected from the group consisting of 1,3-butadiene, isoprene, myrcene, 2,3-dimethyl-1,3-butadiene, 1,3-pentadiene (piperylene), 2-methyl-3-ethyl-1,3-butadiene, 3-methyl-1,3-pentadiene, 1,3-hexadiene, 2,5-dimethyl-2,4-hexadiene and 1,3-octadiene.

35. The polymer of claim 32 wherein the alkenylsubstituted aromatic compound is selected from alpha-methylstyrene, styrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene and 1,2-diphenyl-4-methylhexene-1.

36. The polymer of claim 32 further comprising the step of hydrogenating the polymerized conjugated diene.

37. The polymer produced by the process of claim 21.
38. The polymer produced by the process of claim 22.
39. The polymer produced by the process of claim 23.
40. The polymer produced by the process of claim 24.
41. The polymer produced by the process of claim 25.
42. The polymer produced by the process of claim 26.
43. The polymer produced by the process of claim 27.
44. The polymer produced by the process of claim 28.
45. The polymer produced by the process of claim 29.
46. The polymer produced by the process of claim 30.
47. The polymer produced by the process of claim 31.

* * * * *

UNITED STATES PATENT AND TRADEMARK OFFICE
CERTIFICATE OF CORRECTION

PATENT NO. : 5,821,307
DATED : October 13 1998
INVENTOR(S) : Schwindeman et al.

It is certified that error appears in the above-identified patent and that said Letters Patent is hereby corrected as shown below:

Column 14, line 49, "butyidimethylsilyoxy" should read --butyldimethylsilyloxy--.

Column 16, line 32, "vinyinaphthalene" should read --vinylnaphthalene--; line 66, "claim 18" should read --claim 16--.

Column 17, line 4, "claim 18" should read --claim 16--; line 9, "claim 18" should read --claim 16--; line 10, omit "to".

Signed and Sealed this

Sixteenth Day of February, 1999

Attest:

*Attesting Officer*

*Acting Commissioner of Patents and Trademarks*